United States Patent [19]

Basile et al.

[11] Patent Number: 5,099,247
[45] Date of Patent: Mar. 24, 1992

[54] ELECTRONIC STEERING OF PATTERN OF AN ANTENNA SYSTEM

[75] Inventors: Philip C. Basile, Turnersville, N.J.; Bruce E. Kabernagel, Levittown, Pa.

[73] Assignee: General Electric Company, Philadelphia, Pa.

[21] Appl. No.: 627,309

[22] Filed: Dec. 14, 1990

[51] Int. Cl.$^5$ ............................ G01S 3/16; H01Q 3/22
[52] U.S. Cl. ...................................... 342/380; 342/368
[58] Field of Search ............... 342/378, 383, 448, 368, 342/16, 380

[56] References Cited

U.S. PATENT DOCUMENTS 3,964,065 6/1976 Roberts et al. ............... 342/380
4,298,873 11/1981 Roberts ....................... 342/375

Primary Examiner—Gregory C. Issing
Attorney, Agent, or Firm—Allen E. Amgott; Geoffrey H. Krauss

[57] ABSTRACT

Apparatus for electronically steering a null in a total radiation-reception pattern provided by a set of angularly disposed (preferably substantially-orthogonally-positioned RF) antennae, uses: first and second N-bit binary attenuator subsystems for modifying the amplitude of a signal provided by an associated one of the pair of antennae, responsive to an associated one of first and second control data signals; a set of look-up tables, receiving null-angle input data, provide the first and second signals as the sine and cosine, respectively, of the input null-angle; and the output of the first and second attenuator means are then combined to provide an output signal in which contributions arriving at the set of antennae substantially at the null angle are substantially reduced. The signal combiner may include at least one polarity reversal circuit, possibly including a transformer and/or switch means, to accommodate nulling to all four quadrants of a full circular response pattern.

16 Claims, 4 Drawing Sheets

ELECTRONIC STEERING OF PATTERN OF AN ANTENNA SYSTEM

FIELD OF THE INVENTION

The present invention relates to radio frequency (RF) antennae and, more particularly, to a novel method and apparatus for electronically steering the pattern of an angularly disposed set of RF antennae (preferably a pair of loop antennae positioned orthogonal to one another).

BACKGROUND OF THE INVENTION

It is well known that radio reception in certain environments, particularly those having at least one unwanted or interfering signal source, require the ability to selectively null the unwanted/interfering signal while normally receiving the desired signal. One widely accepted method for selectively steering a null (in an antenna reception pattern designed to have such a null) to selectively remove an undesired signal, is the remote rotation of the antenna pattern of a pair of orthogonally-disposed fixed H-field loop antennae, or the rotation of the antenna system itself. Conventional techniques for steering the null to a desired direction employ synchro/resolver units to mechanically rotate the directional headings of the loops and so create an antenna null in a desired direction. The resolver, a mechanically rotating assembly, produces a null in accordance with the equation:

$$V_{null} = \{((A1^{2*}\cos^2\theta)/2) + ((A2^{2*}\sin^2\theta)/2) - (A1^*A2^*\cos\theta^*\sin\theta^*\cos\phi)\}^{\frac{1}{2}}$$

where A1 is the signal amplitude along the first path (from a first one of the antennae), A2 is the amplitude in the second path (from the second antenna), $\theta$ is the resolver pointing angle, and $\phi$ is a differential phase shift angle between the first and second path signals (i.e., the amount of differential signal delay introduced by the receiving system). It will be seen that the mechanical rotating assembly must be positioned precisely in order to achieve the desired result and must make use of a synchronous feedback system to achieve this precision. This synchronous feedback controlled circuitry, used to set the resolver null-steering rotary-coil assembly, may typically receive binary angle information data, obtained by a digital input system, and must utilize such data to provide an analog signal for controlling the classic AC position control system, utilizing AC amplifiers, a two-phase motor, a mechanical rotating synchronous generator and a mechanical rotating transformer. It is therefore not only highly desirable to replace all of these mechanical synchro/resolver components, but also to do so in a manner allowing electronic null steering without the necessity for mechanically rotating the various assemblies or the antennae themselves.

BRIEF SUMMARY OF THE INVENTION

In accordance with the invention, apparatus for electronically steering a null in a total radiation-reception pattern provided by a set (pair) of angularly disposed (preferably substantially-orthogonally-positioned) RF antennae, comprises: first and second N-bit binary attenuator means for modifying the amplitude of a signal provided by an associated one of the pair of antennae, responsive to an associated one of first and second control data signals; means receiving null-angle input data for providing the first and second signals as the sine and cosine, respectively, of said input null-angle; and means for combining the output of the first and second attenuator means to provide an output signal in which contributions arriving at the set (pair) of antennae substantially at the null angle are substantially reduced. The signal combiner means may include at least one polarity reversal means, possibly including a transformer and/or switch means, for inverting the polarity of a signal coming from the output of one of the attenuator means, so as to accommodate nulling to all four quadrants of a full circular response pattern.

In the presently preferred embodiment, digital angle data is received and is converted to the sine and cosine of that angle by use of digital PROMs operating as lookup tables. Each attenuator contains $N = 8$ bits of RF attenuation means, in steps of six dB., as well as a pair of in-phase, N-way signal divider/combiner means.

Accordingly, it is an object of the present invention to provide a RF antenna system in which a substantial null can be electronically steered, without movement of the physical antennae or use of mechanical synchro/resolver assemblies.

This and other objects of the present invention will become apparent to those skilled in the art upon reading the following detailed description, when considered in conjunction with the associated drawings.

DETAILED DESCRIPTION OF INVENTION

Figure 1:
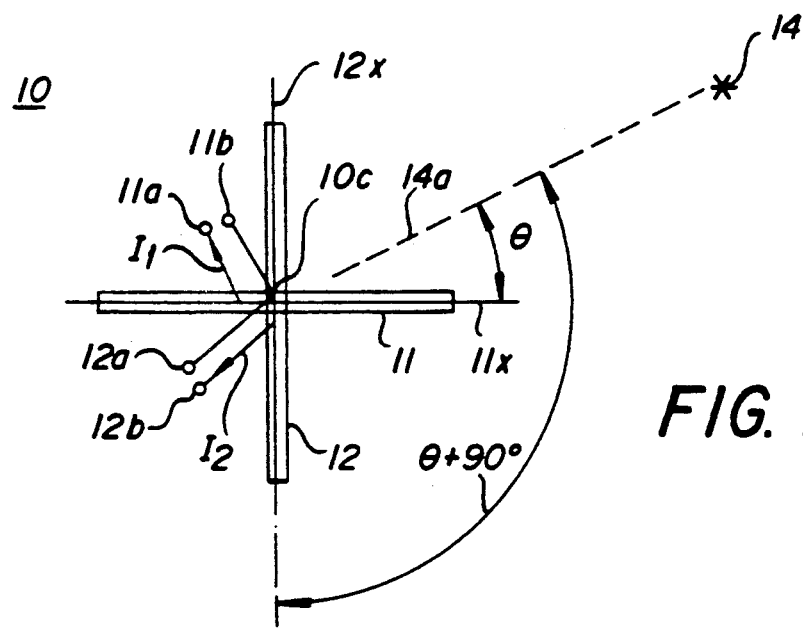
FIG. 1 is a schematic view of a pair of substantially-orthogonal RF antennae, and of a source to which an antenna system null is to be steered.

Referring initially to FIG. 1, a radio-frequency (RF) antenna system 10 is comprised of first and second linear antennae 11 and 12, respectively positioned essentially orthogonal to one another. First antenna 11 has a pair of terminals 11a/11b from which a signal current $I_1$ flows responsive to the signal induced in antenna 11 from a signal source 14, within the plane of antenna 11 and along a line at some angle $\theta$ to the elongated axis 11x of that antenna. Orthogonal antenna 12 also has a pair of connection terminals 12a/12b, through which a current $I_2$ flows responsive to the signal from source 14, and to the angle $(\theta + 90°)$ between the antenna axis 12x and the line 14a.

Figure 1A:
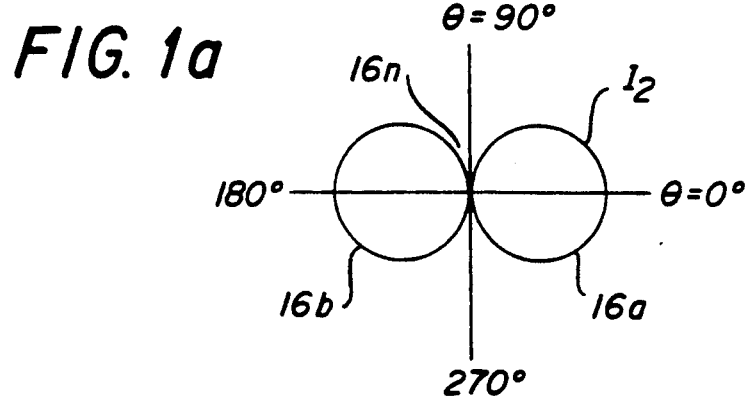
FIGS. 1a-1c are graphs illustrating the current response patterns of the first, second and summed antennae of the system of FIG. 1.
Figure 1B:
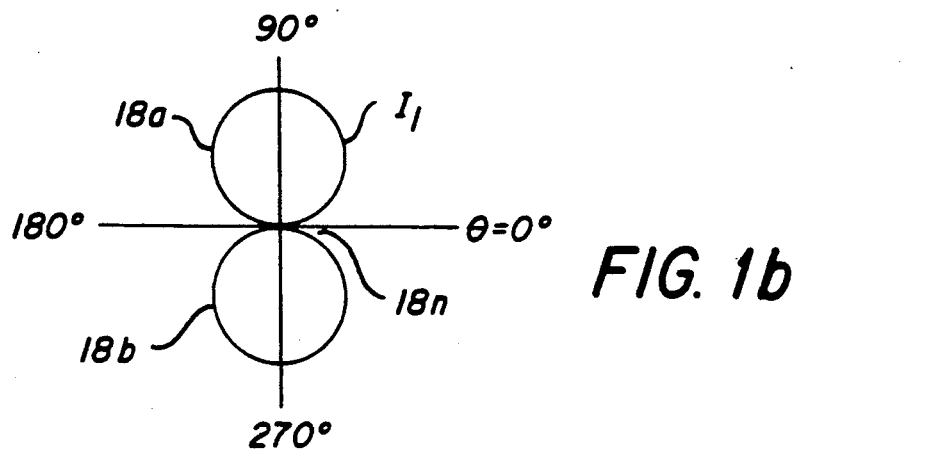
Figure 1C:
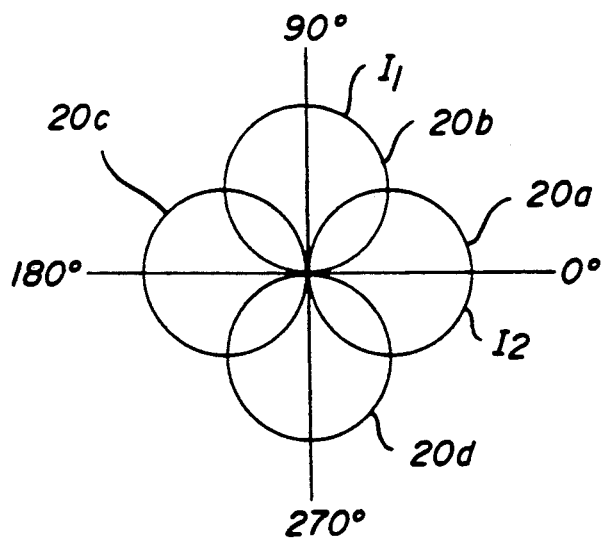
Figure 1D:
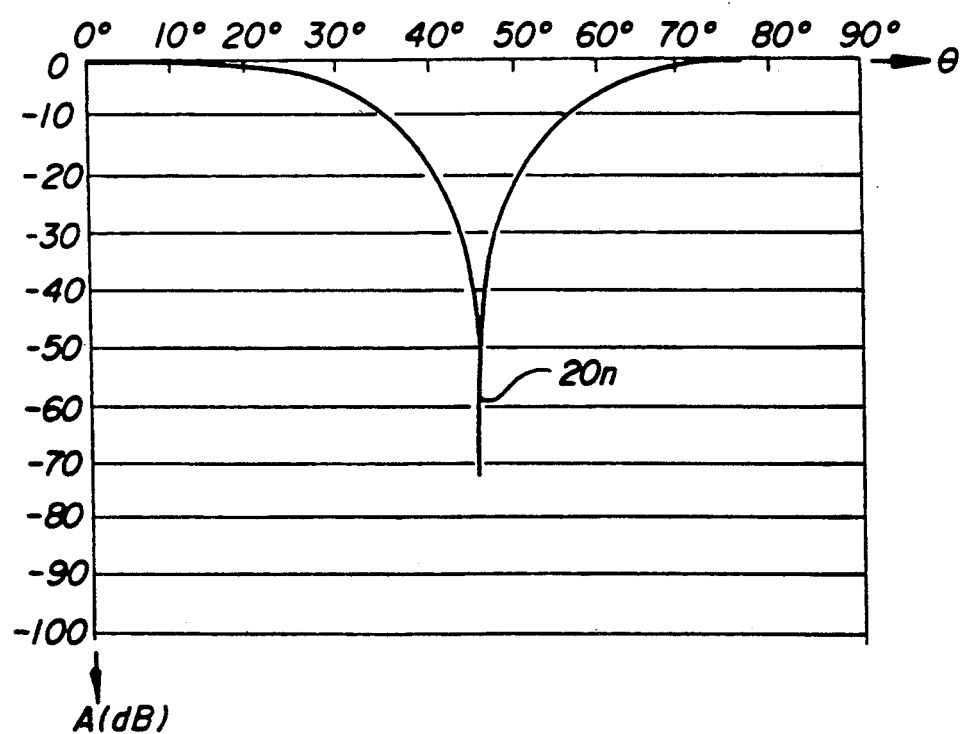
FIG. 1d is a graph illustrating the amplitude response pattern for a null of the electronically steered system of the present invention.

Referring now to FIGS. 1 and 1a, the response current $I_2$ of loop antenna 12 shows a lobular pattern with a first, or front, lobe 16a or with a second, or back, lobe 16b having a maximum when the antenna is broadside to the source ($\theta = 0°$ or $\theta = 180°$) but with a null 16n with the loop antenna turned so that its axis 12x points at the source ($\theta = 90°$ or $\theta = 270°$). Similarly, the current $I_1$ response (FIG. 1b) of the first loop antenna 11 shows a null 18n when the antenna axis 11x is aligned with (i.e. is pointing at) the source ($\theta = 0°$ or $\theta = 180°$), but shows lobular maxima 18a/18b with the antenna axis 11x broadside to the source ($\theta = 90°$ or $\theta = 270°$). When the responses of the two separate, orthogonal antennae are overlayed (FIG. 1c), a four-lobed pattern 20 is produced with one of four lobes 20a-20d, centered along each quadrant axis ($\theta = 0°$, 90°, 180° or 270°). The depth of a null 20n, as set by the above equation with $\theta = 45°$, is shown in FIG. 1d, where the null is located at 45° with respect to a lobular maxima and is of an attenuation which can be in excess of 70 dB relative to the lobular maxima. Thus, the electromagnetic radiation of the source produces currents in each loop, which is dependent upon the degree to which that one of the orthogonal loops is perpendicular to the magnetic portion of the source field; the result is to create deep nulls in the total pattern, which nulls hitherto have required mechanical rotation of the entire antenna assembly to position at a desired heading, or use of a resolver. In many cases it is impossible to actually turn the loop antennae 11/12, and, even if actual rotation is possible, it is highly desirable to be able to electronically steer the angular location of the response nulls 20n.

Figures 2, 2A:
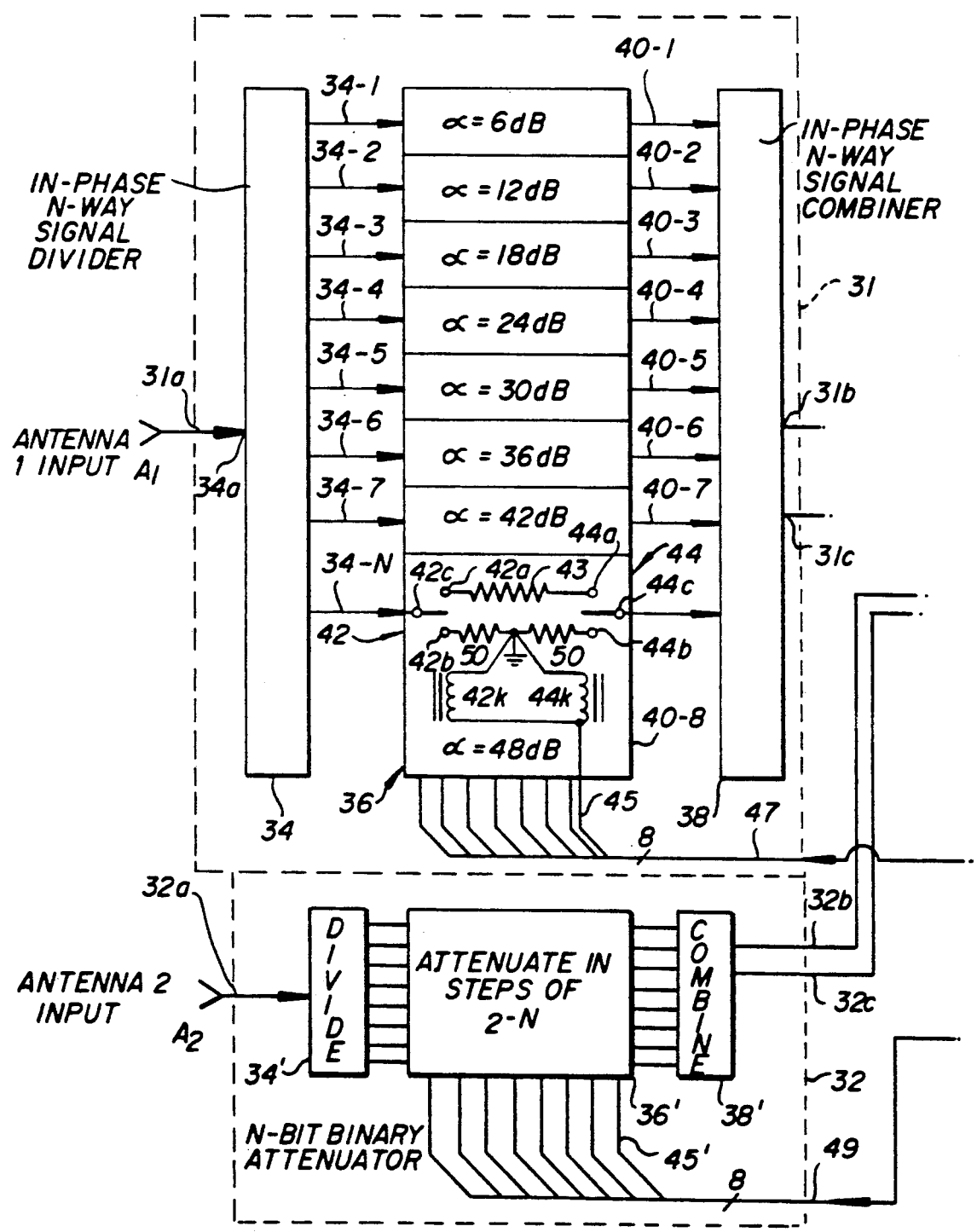
FIGS. 2, 2a and 2b are a schematic block diagram of a presently preferred embodiment of the present invention.
Figure 2B:
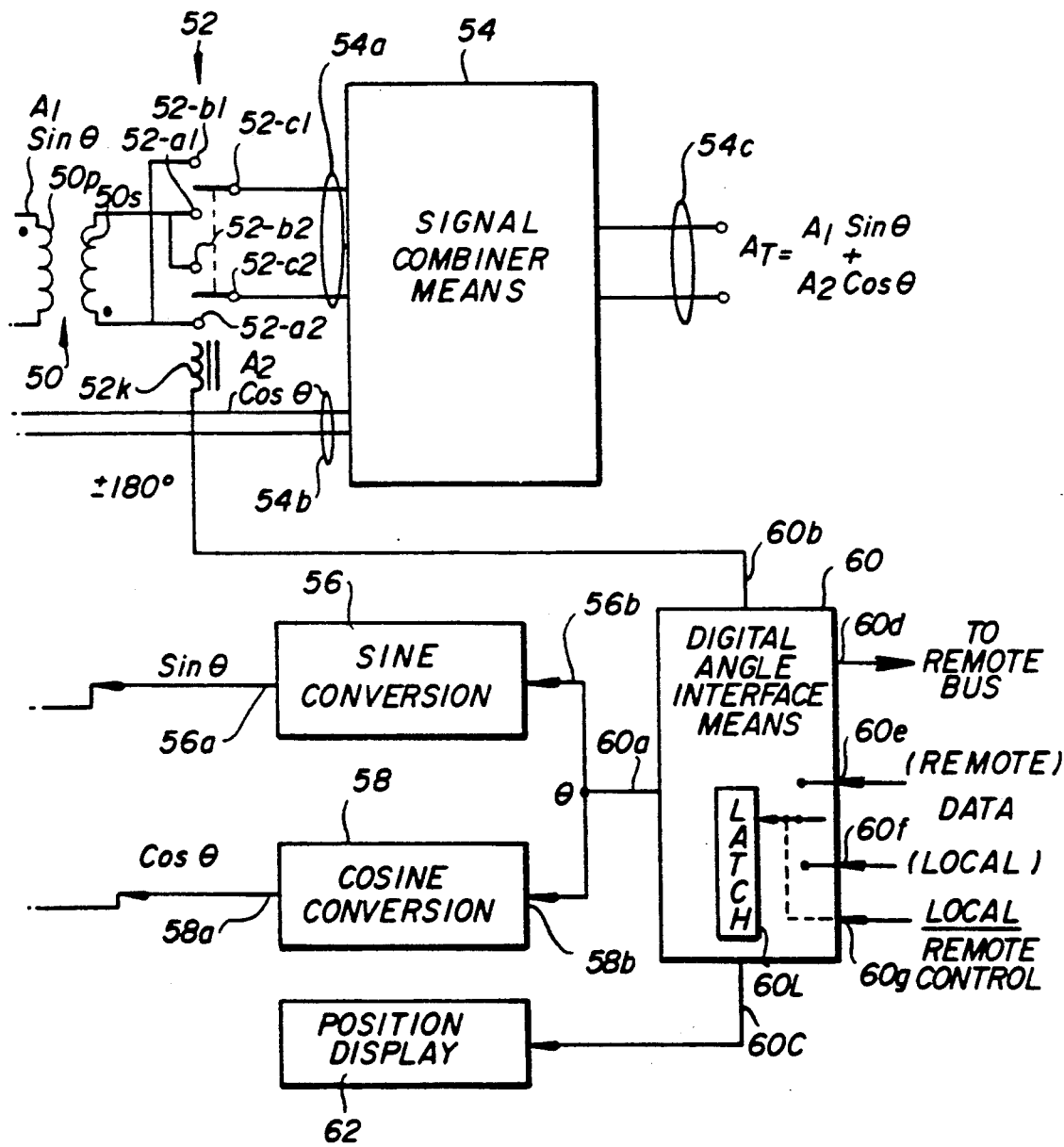

Referring now to FIG. 2, in accordance with a principle of the present invention, a null of a RF antenna system having at least one null provided by a pair of substantially orthogonal antenna means, is electronically steered to appear at a desired angle $\theta$, with respect to a chosen reference, by multiplying the output signal $A_1$ of a first antenna by the sine function of the angle $\theta$ to which the null is to be steered, and by multiplying the output signal $A_2$ of the other antenna by a cosine function of that same angle; the sine-modified and cosine-modified signals are then electronically added to produce a null in the direction of the angle. Thus, if the output of the first antenna is a signal $A_1$ and the output of the second antenna 12 is a signal $A_2$, a null at an angle $\theta$ is provided by adding the sine-modified first signal ($A_1 \sin \theta$) to the cosine-modified second signal ($A_2 \cos \theta$). The total antenna system signal $A_T = A_1 \sin \theta + A_2 \cos \theta$ contains the desired null, with the null azimuth being electronically variable, by varying the modification data $\sin \theta$ and $\cos \theta$, without physical rotation of the orthogonally-oriented antennae 11 and 12.

The rotation and combination are accomplished by system electronics assembly 30. The first antenna signal $A_1$ is provided to an input 31a of a first N-bit binary attenuator means 31 and is applied to a signal input 34a of an in-phase N-way signal divider 34, having N individual outputs 34-1 through 34-n, at each one of which an equal 1/N-th portion of the input signal is provided. While not specifically shown, an amplifier means may be used between input 31 and input 34a, to booster antenna signal amplitude prior to division to provide noise or impedance matching, or any other desired action. Each output 34-1 to 34-n is connected to the input of an associated one of the N attenuators of attenuation means 36; each attenuator has its output connected to an associated one of the N inputs of an in-phase, N-way signal combiner 38. Means 36 comprises attenuators 40-1 to 40-N, each attenuating its input signal by an attenuation $\alpha = (6n)$ dB, where n = the attenuator number within the attenuator bank, i.e. n = 1 for the first attenuator 40-1, n = 2 for the second attenuator 40-2, and n = N for the n-th attenuator 40-n). Thus, in a binary attenuator of N = 8 bits, the individual attenuators 40-1 through 40-8 have attenuations of 6, 12, 18, 24, 30, 36, 42 and 48 dB., sequentially. The attenuated signals are combined in means 38 and result in an attenuator means output signal $A_1 \sin \theta$, between terminals 31b and 31c.

Each attenuator section 40-i, where $1 \le i \le N$, is comprised of an input switching means 42 and an output switching means 44. The input switching means 42 has a first selectable terminal 42a connected through an attenuator element 43 to a first selectable terminal 44a of the output switching means, responsive to the presence of a first state of a binary control signal at a control input 45. A second selectable terminal 42b/43b of the input/output switching means is connected through an associated terminating impedance 46 to system common, responsive to receipt of the other control signal state. The coordinated connection of the input switching means common 42c and the output switching means common 44c to either route the signal through the attenuation means 43 or to terminate the signal with very low signal feedthrough, is controlled by the input and output switching means coils 42k and 44k, responsive to the state of an energizing signal at the individual bit attenuator input 45 in a control cable 47.

The second antenna provides its signal $A_2$ to the input 32a of another N-bit binary attenuator means 32, having its input signal divider means 34′, means 36′ for attenuating the output of divider 34′ in steps of $2^{-N}$ responsive to the signals at control inputs 45′ provided via control cable 49, and an output N-way, in-phase signal combining means 38′, to provide the cosine-modified signal $A_2 \cos \theta$ between second attenuator means output terminals 32b and 32c.

The operation of attenuator means 31 or 32 occurs as follows: the input signal is divided into N separate signals, each having 1/N of the total amplitude of the incoming signal. Each of the N separate signals is thus provided to the input switching means 42 of the associated i-th attenuation means 40-i. If the logic state at the associated control input 45 is a logic "zero", both switching means 42 and 44 connect their common terminals 42c/44c to the second selectable terminals 42b/44b and thence through one of terminations 46 to circuit common potential. In this condition, the incoming signal is terminated and the attenuator output signal, from output switching means common terminal 44c is substantially zero (as the attenuator is selected for sufficiently low feedthrough signal leakage so that the isolation attenuation is at least 20 dB greater than the greatest attenuator rating, e.g. leakage of at least 70 dB for 48 dB attenuation in the highest attenuator 40-8). If the binary logic signal at control input 45 is a logic "one" for that attenuation "bit", input and output switches 42/44 are operated to connect the common terminal 42c/44c thereof to the first selectable terminals 42a/44a, so that the incoming signal is attenuated by the attenuation element 43 and the attenuated signal is provided from the output of the attenuator to the associate input of the signal combiner means 38. Thus, if the first attenuator 4-1 control line 45 is energized to the logic one level, the amplitude of the signal at the first signal divider output 34-1 is attenuated by a factor of 0.5 (i.e. 6 dB) and this half-amplitude signal is combined in means 38 into the total first channel output signal $A_1 \sin \theta$. If the first attenuator bit signal has a logic zero state, the signal at output 34-1 is terminated and essentially provides no contribution to the first channel output signal. Similarly, the signal at second signal divider output 34-2 can be terminated and provide no channel output contribution if the second attenuator 40-2 control input 45 receives a logic zero, or, if the input receives a logic one signal, this signal portion is attenuated by 12 dB (so that the output signal is 0.25 of the input signal) and this contribution is added to the contribution of all other attenuator pathways to provide the total channel output signal similarly with all the other six binary attenuation bits. It will be seen that the output of each attenuation bit is either essentially zero, or is the input signal reduced by a factor of $\frac{1}{2}^i$ where i is the bit number, from $i=1$ to $i=N$.

The output of the first antenna channel attenuator means 31 appears between output terminals 31b and 31c and is coupled across the primary winding 50p of an inverter transformer means 50. The polarity-inverted signal appears across the transformer secondary winding 50s and is connected to a double-pole, double-throw switch means 52. Thus, a first end of the transformer means secondary winding is connected to first-switching-section, first-selectable terminal 52-1a and second-switching-section, second-selectable terminal 52-b2, while the other end of the secondary winding is connected to first-switching-section, second-selectable terminal 52b-1 and also to second-switching-section, first-selectable terminal 52-a2. Connection of the first or second selectable terminals to the associated section common terminals 52-c1/52-c2 is controlled by the signal provided to a switching means control input 52k, to determine the sign of the sin $\theta$ function (i.e. $\pm 180°$). The normal-polarity or reverse-polarity first channel signal $A_1 \sin \theta$ is provided to a first input 54a of a signal combiner means 54, receiving at its second input 54b the second channel modified output signal $A_2 \cos \theta$. The total signal $A_T = A_1 \sin \theta + A_2 \cos \theta$ is provided at an output 54c of the signal combiner means. This signal will have a null therein at the angular orientation $\theta$ determined by the data on signal lines 47 and 49, and by the state of the signal to switching control input 52k. The N-bit data word determining sin $\theta$ on data lines 47, and the N-bit data word determining cos $\theta$ on control lines 49 are provided at the respective outputs 56a/58a of respective sine conversion means 56 and cosine conversion means 58, responsive to the angle $\theta$ data provided to both inputs 56b and 58b thereof. Advantageously, the conversion means 56 and 58 contain PROM logic memories preprogrammed to provide the N-bits of binary angle data responsive to M bits of angle $\theta$ input data. As an example, where $M = 14$ bits of angle $\theta$ data (i.e. an angle resolution of at least 0.1°) and $N=8$ bits of sine $\theta$ and cosine $\theta$ data, consider the illustrative case of $\theta = 30.0°$. Then sine $\theta = 0.5000000$, or, as a binary number, sin $\theta = 10000000$; while cosine $\theta = 0.8660254$ or, as a binary number, 11011101. In channel 1, the signal at the input divider first output 34-1 passes through the first bit attenuator 40-1 and the resulting 0.5 weighted signal is the only contribution provided across output terminals 31b/31c, as all of the other attenuators 40-2 through 40-8 terminate their respective divider outputs and do not contribute to the attenuator means output signal. In the second channel attenuator means 32, the first, second, fourth, fifth, sixth and eighth bit attenuators operate upon the associated signal divider means output and so contribute signals that are weighted, respectively, by the factors 0.5, 0.25, 0.0625, 0.03125, 0.015625 and 0.00390625. The third and seventh bit attenuators (having weights of 0.125 and 0.0078125, respectively) terminate the signal and do not provide contributions. It will be seen that when the first, second, fourth, fifth, sixth and eighth bit-weighted signals are combined, the second channel output signal, between terminals 32b and 32c, has a weight of 0.8632812 (which is within 0.004 of the desired value for cosine 30°). Those skilled in the art will immediately recognize that not only can the angular sine and cosine data be placed in programmable read-only memories and the like, as programmed from standard tables, utilizing the method of casting out ones and the like, but also can be directly calculated by any computational means desired, even including a small microcomputer and the like if required, resident in the sine/cosine conversion means 56/58.

The angle $\theta$ data for inputs 56b/58b is provided at a first output 60a of a digital angle interface means 60, which also provides, at a second output 60b, the quadrant-determining signal to switching means input 52k, as well as angle display information at another output 60c, for display, if desired, by a position display means 62. The angle data may be provided at the output of internal latch means 60L. The interface means can also provide the present nulling angle as data, in any chosen format, at another output 60d, to a remote data bus and the like. All of this data is responsive to the angle selection at one of remote selection data input 60e or local selection data input 60f, responsive to a local/remote control signal at an input 60g. Thus, a local operator can set the state of the logic signal at input 60g for local control, allowing the operator to determine the nulling angle via data provided at input 60f, and providing information feedback to the operator by display on position display means 62; the data can also be simultaneously sent out to remote bus, via output 60d, for other use as required. Conversely, a remote operator (human or otherwise) can control the nulling angle via remote data to input 60e (if the state of the signal at control input 60g selects remote operation) with the remote-selected angle being verified via remote bus data output 60d; any local operator can still ascertain the nulling angle position means by reference to display means 62.

A method and system for the electronic steering of the pattern of a system of linear antennae arranged in a known manner, e.g. a pair of orthogonal loop antennae, for nulling of an outside signal at some steering angle, without the actual physical movement of the antennae, has been described hereinabove. It will now be readily understood by those skilled in the art that the particular apparatus illustrated can steer a null over an angle of $\pm 90°$ (i.e. the first and fourth quadrants, wherein the cosine of the angle is always positive, even though the sine can be selected positive or negative), and that 4-quadrant steering can be achieved by use of a second inverter means 50/polarity-selected switching means 52 between attenuator means 32 and signal combiner means second input 54b. It will also be understood that dependent upon the type of antenna system utilized, null angle selection over more than one quadrant may not be necessary; for example, the illustrated four-leaf-clover pattern has four nulls spaced 90° from one another, so that null steering over a single quadrant only is sufficient to null a single source at any angle over a full circular pattern.

Though one presently preferred embodiment of our novel method and apparatus for electronic steering of the pattern of orthogonal antennae has been described in some detail herein, many modifications and variations will now become apparent to those skilled in the art. It is our intent, therefore, to be limited only by the scope of the appending claims, and not by the specific details and instrumentalities presented by way of explanation of the presently preferred embodiments described herein.

What I claim is:

1. A method for electronically steering a null in a total radiation pattern provided by a plurality of angularly-disposed RF antennae, comprising the steps of:
   providing a plurality of control signals responsive to received null-angle data;
   modifying, responsive to an associated one of the control signals, the amplitude of a signal provided by each associated antenna, by the steps of: dividing the signal from the associated antenna into N separate signals; separately attenuating each of the N signals by a selected attenuation value $a_N$ only if that signal is to be includable in the modified signal; and combining all of the separately attenuated signals into the modified signal; and
   combining the modified-amplitude signals to provide an output signal in which contributions arriving at the antennae at the null angle are substantially reduced.

2. The method of claim 1, further including the step of selecting the modified-amplitude signals to cause the null to be steered into any quadrant of a fully-circular response, by: reversing the polarity of a modified signal; and selecting one of the normal-polarity and reversed-polarity signals as the modified-amplitude signal sent to the combining step.

3. The method of claim 2, including the steps of: providing a first modified-amplitude signal from a first one of a pair of antennae; providing a second modified-amplitude signal from the other one of the pair of antennae; and selectably reversing each signal before combination.

4. The method of claim 1, wherein the attenuating step includes the steps of: providing N separate attenuators; individually connecting, in any one of the N attenuators, the separate signal input to that attenuator to a termination means responsive to a first state of a control bit signal; and individually connecting, in the same attenuator, the separate signal through the attenuator responsive to another state of the same control bit signal.

5. The method of claim 4, comprising the step of setting each of the attenuators to have a binary-weighted attenuation.

6. The method of claim 1, further including the steps of: receiving data establishing a steering angle; providing a first modifying data signal approximating a sine function of the steering angle; and providing a second modifying data signal approximating cosine function of the steering angle.

7. The method of claim 1, further including the step of selecting between locally-originating and remotely-originating steering data.

8. Apparatus for electronically steering a null in a total radiation pattern provided by a plurality of angularly-disposed RF antennae, comprising:
   means for modifying, responsive to an associated control signal, the amplitude of a signal provided by each associated antenna, with each modifying means including: means for dividng the signal from the associated antenna into N separate signals; means for separately attenuating each of the N signals by a selected attenuation value $a_N$ only if that signal is to be includable in the modified signal to be output from said modifying means; and means for combining all of the separately attenuated signals into the modified signal:
   means receiving null-angle data for providing the control signals; and
   means for combining the modified-amplitude signal to provide an output signal in which contributions arriving at the antennae at the null angle are substantially reduced.

9. The apparatus of claim 8, wherein the facilitating means includes: at least one means for reversing the polarity of a modified signal; and means for selecting one of the normal-polarity and reversed-polarity signals as the modified-amplitude signal sent to the combining means.

10. The apparatus of claim 9, wherein a pair of antennae each provide one of a pair of modified-amplitude signals, and each signal is applied through a reversing means, before combination.

11. The apparatus of claim 8, wherein the attenuating means includes N separate attenuators, each having switching means for individually connecting the associated signal to a selected one of a termination means and through said attenuator to an output connected to said combining means.

12. The apparatus of claim 11, wherein each of said attenuating means comprises N binary-weighted attenuators.

13. The apparatus of claim 8, wherein said control-signal-providing means receives data establishing a steering angle and includes means for providing to a first modifying means data approximating a sine function of the steering angle; and means for providing to a second modifying means data approximating a cosing function of the steering angle.

14. The apparatus of claim 13, wherein said sine and cosine providing means include a memory device programmed to provide trigonometric data responsive to input of angle data.

15. The apparatus of claim 8, wherein said control-signal-providing means includes means for selecting between locally-originating and remotely-originating steering data.

16. The apparatus of claim 15, wherein the steering data selected is provided to a remote location.

* * * * *